Sept. 7, 1948.  C. W. CRUMRINE  2,448,780
ANIMAL TRAP

Filed Aug. 10, 1943  4 Sheets-Sheet 1

INVENTOR.
CHESTER W. CRUMRINE
BY
Beau, Brooks, Buckley & Beau.
Attorneys

Sept. 7, 1948. C. W. CRUMRINE 2,448,780
ANIMAL TRAP
Filed Aug. 10, 1943 4 Sheets-Sheet 3

INVENTOR.
CHESTER W. CRUMRINE
BY
Beau, Brooks, Buckley & Beau.
Attorneys.

Sept. 7, 1948. C. W. CRUMRINE 2,448,780
ANIMAL TRAP
Filed Aug. 10, 1943 4 Sheets-Sheet 4
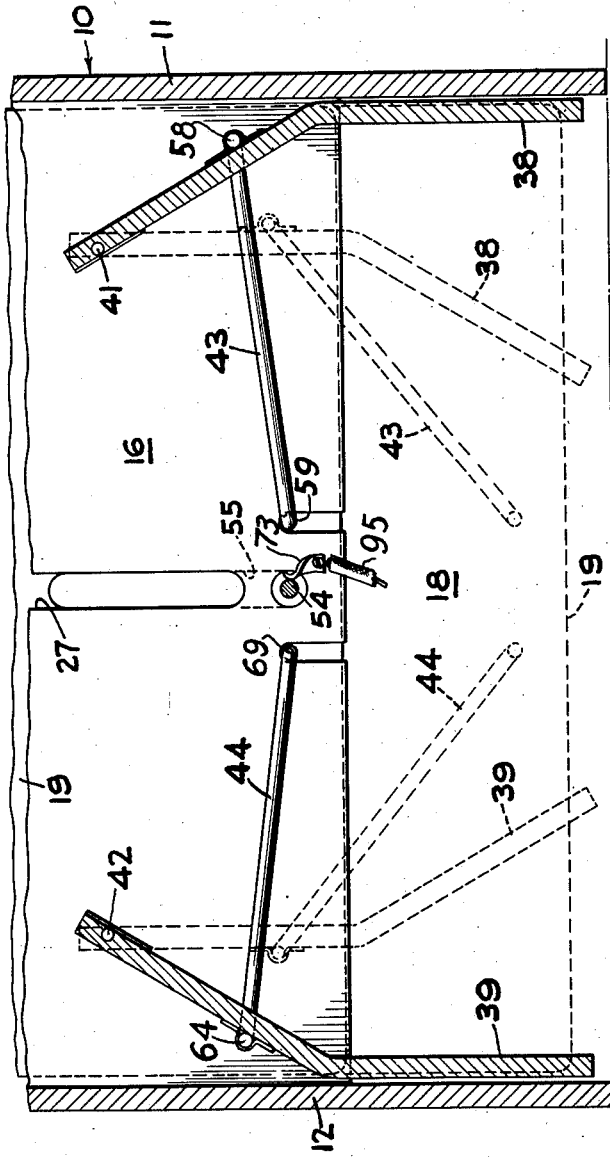
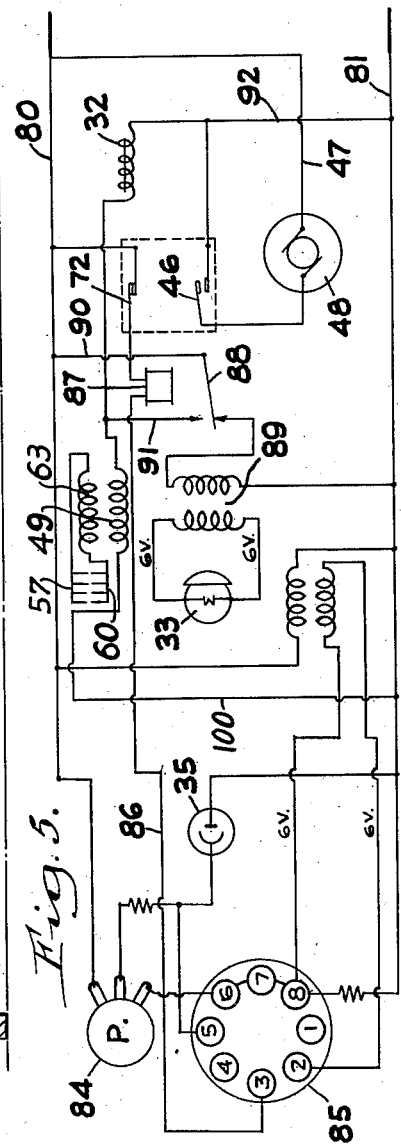
INVENTOR.
CHESTER W. CRUMRINE
BY
Beau, Brooks, Buckley & Beau.
Attorneys.

Patented Sept. 7, 1948

2,448,780

UNITED STATES PATENT OFFICE 2,448,780

ANIMAL TRAP

Chester W. Crumrine, Irondequoit Township, Monroe County, N. Y., assignor, by mesne assignments, to L F C Corporation, Rochester, N. Y., a corporation of New York Application August 10, 1943, Serial No. 498,077

13 Claims. (Cl. 43—99)

This invention relates to animal traps and particularly to a novel fully automatic trap device.

According to the principles of the present invention, light sensitive electrical means initiate a trapping cycle which traps an animal passing through a predetermined trapping zone, electrocutes the animal and automatically disposes of the animal body and restores all of the parts to their initial preset position. By virtue of the particular arrangement of parts the animal is confined quickly and certainly to a predetermined zone from which his body is removed and disposed of in a relatively slower manner whereby the remainder of the trapping cycle may proceed silently and in a manner calculated not to arouse the suspicion of other animals in the vicinity of the trap.

A consideration of the illustrative form of the invention shown in the accompanying drawings and described in detail in the ensuing specification will make clear to those skilled in the art other and further advantages of the trap which forms the subject of the present invention.

In the drawings:

Fig. 4 is a fragmenary cross-sectional view taken on the line 4—4 of Fig. 2; and Fig. 5 is a wiring diagram illustrating schematically the manner in which the electrical connections may be made.

Figure 1:
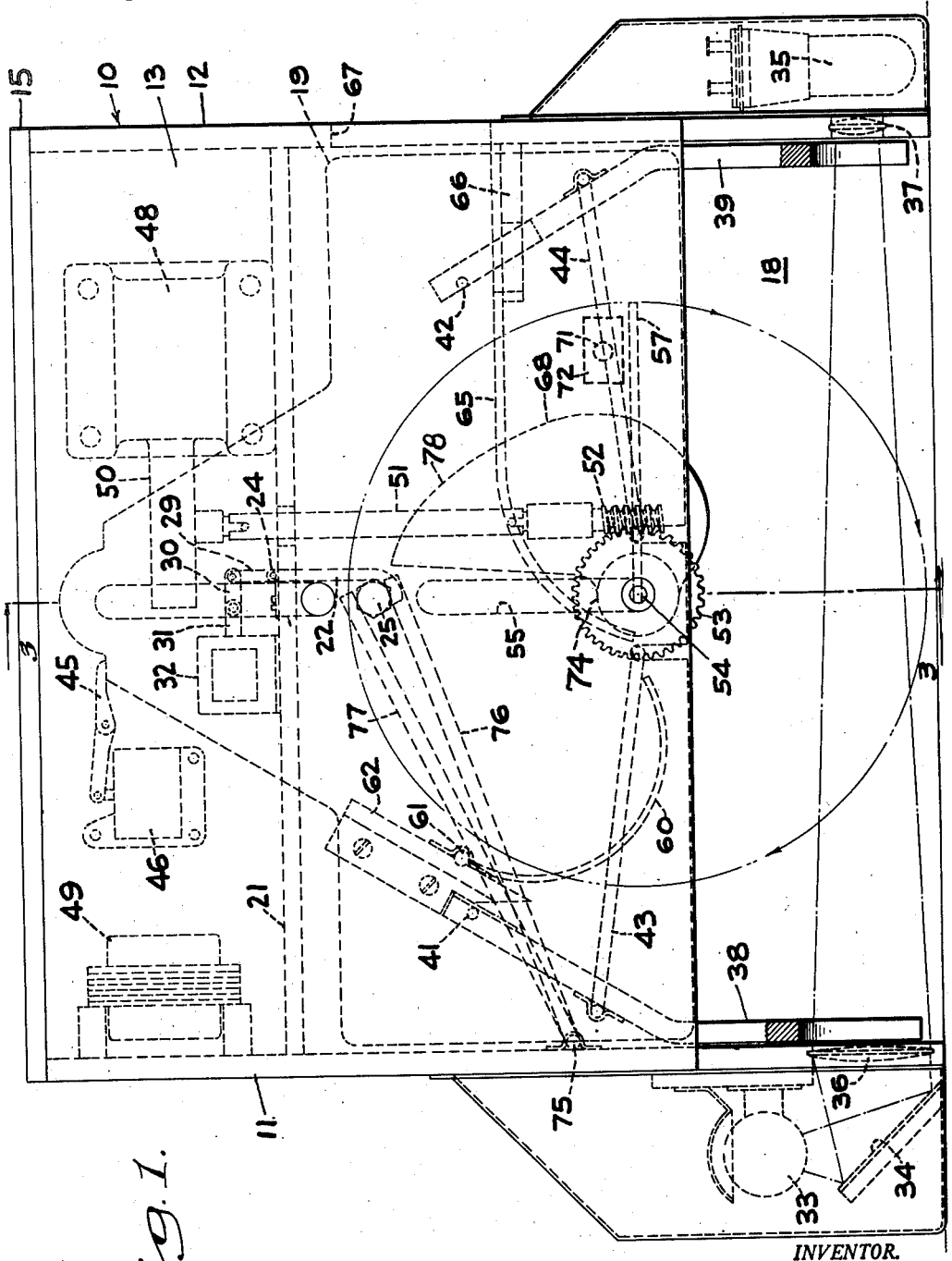
Fig. 1 is a front elevational view, partly in cross-section, of one form of the trap of my invention.

Throughout the several figures of the drawings, like characters of reference denote like parts and the numeral 10 designates generally a casing having opposed side walls 11 and 12, end walls 13 and 14, and a top closure 15. Adjacent to but spaced slightly inwardly from each of the end walls 13 and 14 are transverse partition walls 16 and 17. The end walls 13 and 14 each stop short of the bottom of the casing 10 to provide an unobstructed longitudinal passage 18. The opposite ends of the passage 18 are adapted to be closed off, upon springing of the trap, by a pair of doors 19 and 20 disposed between the end walls 13 and 14 and the partition walls 16 and 17, respectively.

A horizontal panel 21 extends across the interior of the casing 10 and between the side walls 11 and 12 and between the partition walls 16 and 17. This provides an upper compartment, separate from the trapping chamber, for housing various of the electrical units. The doors 19 and 20 are normally retained in raised, open position by a pair of hooks 22 and 23 which depend from a pivot rod 24 which is pivotally secured to the panel 21, see Fig. 3, the hooks 22 and 23 engaging respectively beneath pins 25 and 26 which are carried by the doors 19 and 20 and project through slots 27 and 28 formed in the partition walls 16 and 17. The pivot rod 24 is formed with an offset crank portion 29, Figs. 1 and 3, which is engaged by link 30 which is connected to the armature 31 of an electromagnet 32. Energization of the latter rotates the pivot rod 24 to withdraw the hooks 22 and 23 from beneath the pins 25 and 26 and free the doors 19 and 20 to drop quickly to closed position.

The manner in which electrical actuation is accomplished will be more fully described hereinafter. For the present it will be sufficient to say that a light source 33 located at one side of the casing 10 directs light to a mirror 34 which projects a beam to a photoelectric cell 35. If desired, an infra-red filter 36 may be interposed as shown in Fig. 1 and a lens 37 is preferable to converge the beam to the light-sensitive element of the photo-cell. Interruption of the light beam by the presence of an animal thereacross energizes the electro-magnet 32.

A pair of sweeps 38 and 39 are pivotally suspended by means of pivot pins 41 and 42, respectively, and the sweeps 38 and 39 are connected for movement by and upon movement of the doors 19 and 20 by means of links 43 and 44, respectively, which engage pivotally at their opposite ends with the sweeps and the doors, as appears best in Fig. 4. In Fig. 4 the link 43 is pivotally connected to sweep 38 as at 58 and to the door as at 59. Link 44 is pivotally connected to sweep 39 as at 64 and to the door as at 69. Dropping of the doors pivots the sweeps to the dash-line position of Fig. 4 whereby the lower boundary of the area in which the animal is initially confined, viewed as in Figs. 1 and 4, is approximately arcuate in contour.

As the doors 19 and 20 drop they release a lever 45 which permits closure of a normally open spring actuated switch 46 which controls the energizing circuit 47 of an electric motor 48, see Figs. 1 and 5. Incidentally, and referring particularly to Fig. 5, an electrocuting transformer 49 is connected across the power supply in a manner which will presently appear.

The motor 48, which begins running as soon as the trap is sprung and the doors drop, is provided with a conventional reduction gear unit 50 which in turn rotates a vertically disposed shaft 51 which carries a worm 52 at its lower end, the latter meshing with a worm wheel 53. The worm wheel 53 is mounted on a shaft 54 which is journaled in the end walls 13 and 14 and in the partition walls 16 and 17, as appears best in Fig. 3. The doors 19 and 20 are slotted as at 55 and 56, respectively, to avoid interference with the shaft 54 and bushings 40, later described.

Figure 2:
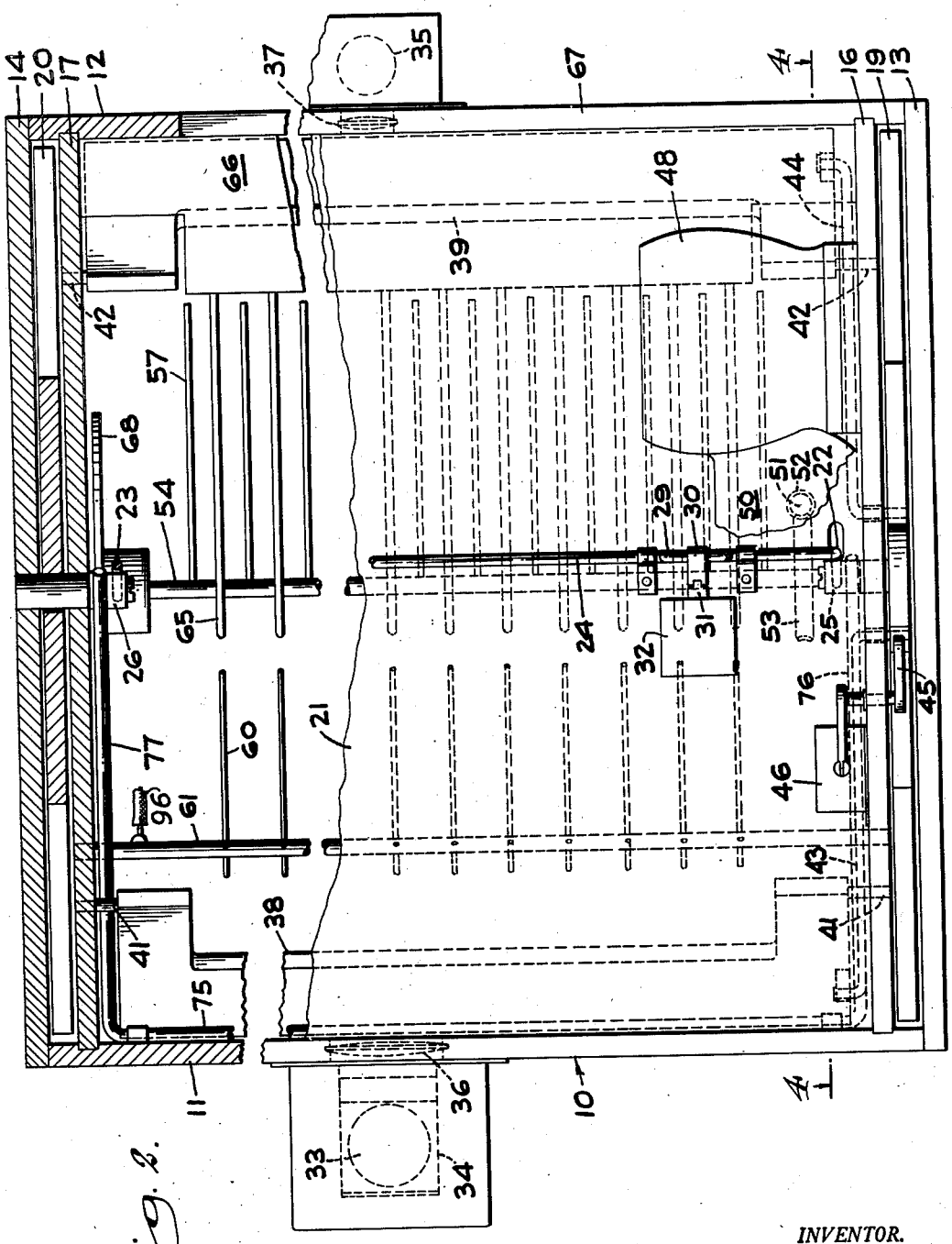
Fig. 2 is a top plan view thereof with portions of the trap casing broken away and other parts in cross section for added clearness.
Figure 3:
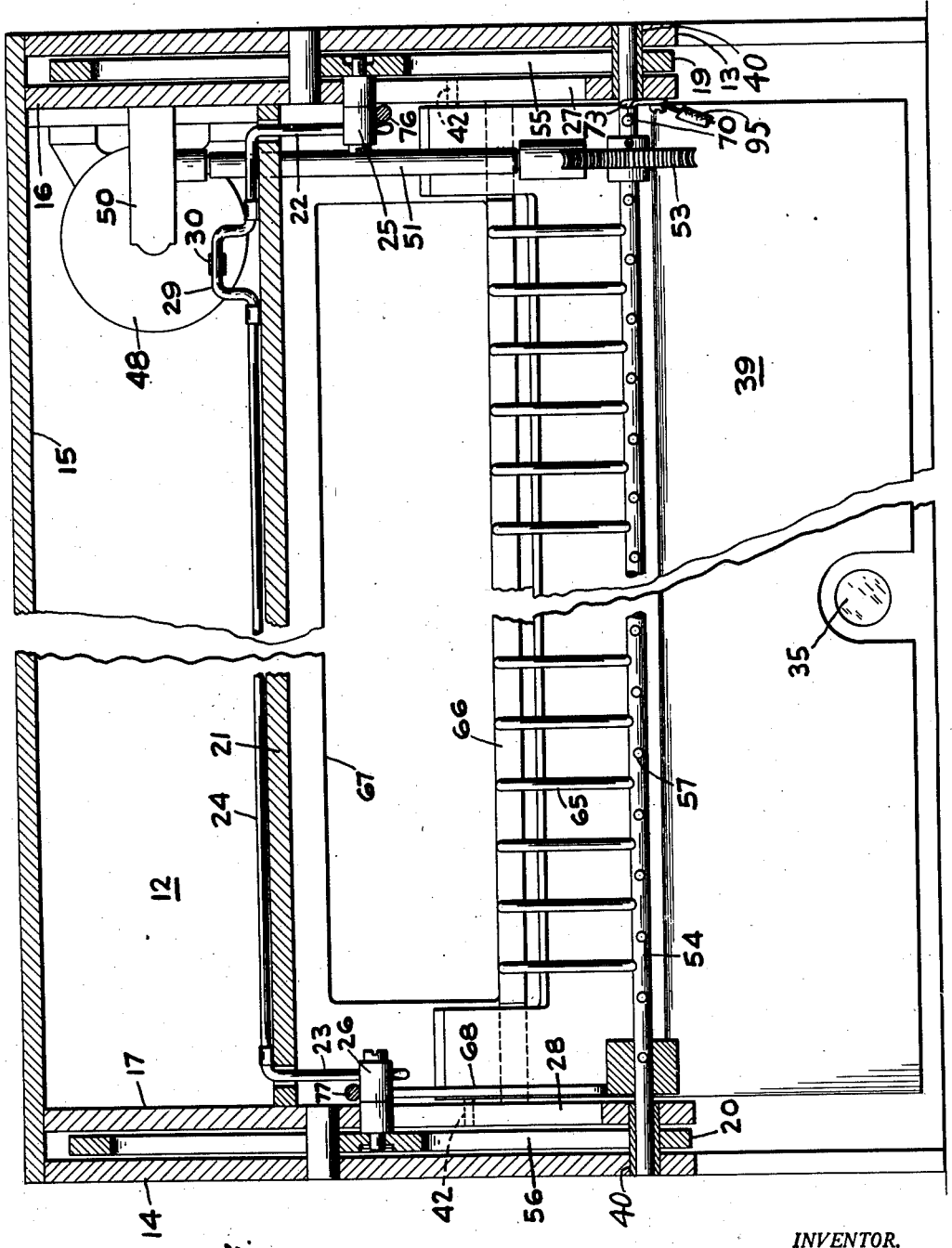
Fig. 3 is a cross-sectional view taken on the line 3—3 of Fig. 1.

A series of parallel bars or tines project from the shaft 54, to the right as viewed in Figs. 1 and 2, to form a grill or sweep 57. The shaft 54 rotates in a clockwise direction as viewed in Fig. 1 and accordingly the sweep 57 traverses the more or less arcuate area to which the trapped animal is confined by the sweeps 38 and 39. The animal is thus moved upwardly out of the passage 18 at the left side thereof and its body encounters a curved grid 60 which is composed of a series of parallel prongs or tines extending from a pivotally mounted shaft 61. The shaft 61 has an insulated mounting as by forming the partition members 16 and 17, in which shaft 61 is journaled, of wood or other insulating material and the grid 60 comprises one terminal of the secondary coil 63 of the electrocuting transformer 49 of Fig. 5, the other terminal thereof being the sweep 57. An oblique longitudinal panel 62 extends between the partition members 16 and 17 and is fixed thereto. Panel 62 limits counterclockwise pivotal movement of grid 60 and forms an upward extension of the inclosure formed by the sweeps 38 and 39 when they are in the dash line position of Fig. 4. Shaft 54 has insulated mounting bushings 40 and a brush contact 73 may be secured against partition member 16 for electrical engagement with shaft 54 as shown in Figs. 3 and 4. A conductor 95 leads to one terminal of the secondary coil 63. Another conductor 96, see Fig. 2, leads from shaft 61 to the other terminal of secondary coil 63 and conductor 96 may be flexible to permit oscillation of shaft 61.

The tines of the sweep 57 and those of the grid 60 are staggered so that, as the grid 60 is pivotally lifted by pressure of an animal body thereagainst, the tines of the sweep 57 are free to rotate past the grid 60 and the then dead animal is deposited upon a stripping grid 65 which comprises a series of parallel prongs or tines extending from a ledge 66 secured to side wall 12. As appears from Fig. 2, the tines of the stripping grid 65 are staggered with respect to the tines of the sweep 57 and the ends of the former are so curved, see Fig. 1, that the animal is moved upwardly and along the top of the stripping grid 65 by the sweep 57, which latter continues to rotate to starting position. An opening 67 is formed in the side wall 12 whereby animal bodies may be pushed out of the trap when the surface of the stripping grid 65 no longer accommodates the number of dead animals present thereon.

A cam 68 is fixed to the shaft 54 of the rotating sweep 57 and when the door 20 drops to closed position the pin 26 fixed thereto drops into engagement with the low point 74 of the cam 68, the latter being rotatable in a clockwise direction as viewed in Fig. 1 and so proportioned that the first half revolution thereof does not affect the pin 26 or the door 20. Subsequently, however, and during the last half revolution of the sweep 57, the door 20 is raised by portion 78 of the cam 68.

In addition to the tines comprising the sweep 57, the shaft 54 is provided with an extra prong 70 which extends the same as the others but is disposed adjacent the partition 16. To avoid confusion this extra prong is shown only in Fig. 3. As the shaft 54 approaches the end of a complete rotation but while the cam 68 is still supporting pin 26 of door 20, the prong 70 passes over a rounded-ended spring projected button 71 of a normally closed microswitch 72 of well-known form disposed against the partition 16 to depress the button and momentarily open the micro-switch. The switch 72, again to avoid confusion, is shown only in Fig. 1 and in the wiring diagram, Fig. 5. The momentary opening of switch 72 de-energizes electromagnet 32 permitting the hooks 22 and 23 to resume latching position with respect to pins 25 and 26, respectively, and also de-energizing the electrocuting transformer 49 in a manner which will presently be described. At the same time, the lever 45 is engaged by the upper part of door 19 during the final upward movement of door 19 and the motor circuit 47 and 48 is opened by opening of switch 46.

The inertia of the motor 48, the cam 68, and the drive means therebetween is sufficient to permit the cam to continue to rotate to substantially the position illustrated in Fig. 1, so as to be automatically disposed for a subsequent trapping, electrocuting, disposing and resetting operation.

It will be noted that only the pin 26 of door 20 is engaged by cam 68. To cause the door 19 to be raised synchronously with door 20 a bail 75 is pivoted against side wall 11, see Figs. 1 and 2. The bail 75 has a pair of arms 76 and 77 extending radially therefrom, the former engaging beneath pin 25 and the latter extending directly over pin 26. The arm 77 thus is rocked by upward movement of door 20 and pin 26, which causes arm 76 to rock and raise pin 25 and door 19 simultaneously with the raising of door 20 by cam 68.

The complete trapping, electrocuting, disposing and resetting cycle is calculated to consume about a minute and a half so that the animal is in contact with the electrocuting electrodes for about half a minute.

Referring now to Fig. 5 and a description of the electrical operation and control of the trap, the numerals 80 and 81 designate the opposed conductors of a conventional 110 volt A. C. power supply. It will be noted that the motor 48 has permanent connection to conductor 80. Switch 46 is connected in series between the motor and conductor 81.

The photoelectric cell 35 is associated in conventional manner with amplifying means which may be in the form of a Thyratron tube No. 2050 or 2051, the tube being provided with a suitable adjustment potentiometer, designated 84 in the drawing. The amplifying tube is designated 85 in Fig. 5. In the representation of Thyratron 85 the encircled numerals indicate the terminals of the Thyratron elements as follows: 2 and 8 the cathode heater, 3 the plate, 5 the grid and 6 the cathode. The output conductor of the amplifying tube 85 is designated 86 and when light fails to travel from lamp 33 to photoelectric cell 35 current flows in conductor 86 which completes its circuit at conductor 80 and includes a relay 87 which controls a two-way switch 88.

When relay 87 is de-energized, as shown in Fig. 5, and when the trap is set to effect a trapping operation, switch 88 closes a circuit across the conductors 80 and 81 to energize a transformer 89 which energizes lamp 33. When an animal breaks the light beam from lamp 33 to photoelectric cell 35, conductor 86 is energized and relay 87 moves switch 88 to open the lamp transformer circuit and a circuit is established, by means of conductors 90, 91 and 92, for energizing the door latch releasing solenoid 32. This movement of switch 88 also closes the electrocuting transformer circuit by way of conductors 90, 91, and 100.

It will be noted that when the relay 87 is initially energized, the lamp transformer is automatically de-energized and remains so while the relay is energized through the output conductor 86 of the amplifying tube 85. As the end of a trapping cycle is approached, however, the prong 70 momentarily opens normally closed switch 72 by passage across the spring projected button 71 thereof. This de-energizes relay 87, whereupon switch 88, which is biased to the position illustrated in Fig. 5 by gravity or in any other way, returns to lamp-energizing position, de-energizing electromagnet 32 and electrocuting transformer 49, and the trap is entirely reset.

The manner in which the photoelectric cell and its amplifier 85 operate is understood by those skilled in the art and need not be described in detail. The adjustment potentiometer is provided for adjusting the sensitivity of operation to suit varying conditions, especially as concerns the presence of greater or lesser amounts of extraneous light. While a single complete specific embodiment has been described herein by way of example, it is to be understood that the invention is not limited thereto, or otherwise than as defined in the appended claims.

A trapping cycle will now be described. When an animal breaks the light beam to photo-electric cell 35 it causes energization of electromagnet 32 and electrocuting transformer 49 in a manner previously described and movement of the armature 31 of electromagnet 32 thereby releases hooks 22 and 23 from beneath the pins 25 and 26 of doors 19 and 20. The doors thus drop and, by means of links 43 and 44, simultaneously move sweeps 38 and 39 to the dash line position of Fig. 4.

Simultaneously, movement of door 19 downward releases lever 45 which permits normally open switch 46 to close and thus close the energizing circuit of motor 48. Shaft 54 thus is rotated in a clockwise direction and the sweep 57 carried by shaft 54 moves to traverse the space defined by the sweeps 38 and 39 in their dash line position of Fig. 4 and the animal is electrocuted by the opposed electrodes comprising sweep 57 and grid 60. The grid 60 is moved upwardly by engagement of the animal body thereagainst as the animal is moved upwardly by sweep 57 and the animal body is ultimately stripped radially outwardly from sweep 57 through the cooperation of the curved stripping grid 65.

During the last half rotation of grid 57 and cam 68, which rotates therewith, the cam operates against pin 26 to raise the doors to the position of Fig. 1. When the doors are raised lever 45 is engaged by door 19 and the motor circuit is broken. The motor has sufficient inertia to permit continued rotation of cam 68 to the position of Fig. 1.

The manner in which micro-switch 72 cooperates to reestablish lamp energization and de-energization of electromagnet 32 and transformer 49 toward the end of a trapping cycle has previously been described. This permits hooks 22 and 23 to reengage pins 25 and 26 and retain the doors in elevated position.

I claim:

1. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said passage and means connecting said sweeps to said closure means whereby dropping of the latter is accompanied by movement of the sweeps toward each other to constrict the transverse area of said passage, and means movable to traverse the constricted passage and move an animal body therefrom to said disposal zone.

2. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said passage and means connecting said sweeps to said closure means whereby dropping of the latter is accompanied by movement of the sweeps toward each other to constrict the transverse area of said passage to substantially arcuate form, and means rotatable to traverse the constricted passage and move an animal body therefrom to said disposal zone.

3. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said passage and means connecting said sweeps to said closure means whereby dropping of the latter is accompanied by movement of the sweeps toward each other to constrict the transverse area of said passage so that it has an approximately arcuate lower boundary, and means rotatably mounted adjacent the upper portion of said passage to completely traverse the constricted passage by rotation therethrough and move an animal body therefrom to said disposal zone above said passage.

4. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said passage and means connecting said sweeps to said closure means whereby dropping of the latter is accompanied by movement of the sweeps toward each other to constrict the transverse area of said passage, means rotatably mounted adjacent the upper portion of said passage to traverse the constricted passage and move an animal body upwardly therefrom, means in said casing above said passage and cooperating with said rotatably mounted means to provide electrocuting means, and other means in said casing above said passage for diverting animal bodies from said rotatably mounted means, said last two mentioned means being in the path of rotation of said rotatable means whereby an animal raised thereto is successively electrocuted and diverted to said disposal zone.

5. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said passage and means connecting said sweeps to said closure means whereby dropping of the latter is accompanied by movement of the sweeps toward each other to constrict the transverse area of said passage, means rotatably mounted adjacent the upper portion of said passage to traverse the constricted passage and move an animal body upwardly therefrom, means in said casing above said passage and cooperating with said rotatably mounted means to provide electrocuting means, other means in said casing above said passage for diverting animal bodies from said rotatably mounted means, said last two mentioned means being in the path of rotation of said rotatable means whereby an animal raised thereto is successively electrocuted and diverted to said disposal zone, and actuating means responsive to the presence of an animal in said passage for automatically effecting a single complete rotation of said rotatably mounted means.

6. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said said passage and means connecting said sweeps to said closure means whereby dropping of the latter is accompanied by movement of the sweeps toward each other to constrict the transverse area of said passage, means rotatably mounted adjacent the upper portion of said passage to traverse the constricted passage and move an animal body upwardly therefrom and continuously to said disposal zone, and means in said casing above said passage and in the path of rotation of said rotatably mounted means and cooperating with said rotatably mounted means to provide electrocuting means whereby an animal raised thereto is electrocuted before reaching the disposal zone.

7. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, depending pivoted sweeps extending longitudinally at opposite sides of said passage and means connecting said sweeps to said closure means whereby dropping of the latter is accompanied by movement of the sweeps toward each other to constrict the transverse area of said passage, means rotatably mounted adjacent the upper portion of said passage to traverse the constricted passage and move an animal body upwardly therefrom and continuously to said disposal zone, means in said casing above said passage and in the path of rotation of said rotatably mounted means and cooperating with said rotatably mounted means to provide electrocuting means whereby an animal raised thereto is electrocuted before reaching the disposal zone, and actuating means responsive to the presence of an animal in said passage for automatically effecting a single complete rotation of said rotatably mounted means.

8. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, means rotatably mounted adjacent the upper portion of said passage to traverse the passage and move an animal body upwardly therefrom, means in said casing above said passage and cooperating with said rotatably mounted means to provide electrocuting means, and other means in said casing above said passage for diverting animal bodies from said rotatably mounted means, said last two mentioned means being in the path of rotation of said rotatably mounted means whereby an animal raised thereto is successively electrocuted and diverted to said disposal zone.

9. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, means rotatably mounted adjacent the upper portion of said passage to traverse the passage and move an animal body upwardly therefrom, means in said casing above said passage and cooperating with said rotatably mounted means to provide electrocuting means, other means in said casing above said passage for diverting animal bodies from said rotatably mounted means, said last two mentioned means being in the path of rotation of said rotatable means whereby an animal raised thereto is successively electrocuted and diverted to said disposal zone, and actuating means responsive to the presence of an animal in said passage for automatically effecting a single complete rotation of said rotatably mounted means.

10. An animal trap comprising a casing having an unobstructed animal passage extending therethrough and an adjacent disposel zone, closure means at opposite ends of said passage and means releasably retaining said closure means in elevated position whereby said closure means are adapted to drop to closed position upon release of said retaining means, means rotatably mounted adjacent the upper portion of said passage to traverse the passage and move an animal body upwardly therefrom and continuously to said disposal zone, and means in said casing above said passage and in the path of rotation of said rotatably mounted means and cooperating with said rotatably mounted means to provide electrocuting means whereby an animal raised thereto is electrocuted before reaching the disposal zone.

11. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, means rotatably mounted adjacent the upper portion of said passage to traverse the passage and move an animal body upwardly therefrom and continuously to said disposal zone, means in said casing above said passage and in the path of rotation of said rotatably mounted means and cooperating with said rotatably mounted means to provide electrocuting means whereby an animal raised thereto is electrocuted before reaching the disposal zone, and actuating means responsive to the presence of an animal in said passage for automatically effecting a single complete rotation of said rotatably mounted means.

12. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, means movable to traverse the passage and move an animal body upwardly therefrom to said disposal zone, and means in said casing above said passage in the path of said movable means and cooperating with said movable means to provide electrocuting means whereby an animal raised thereto is electrocuted before reaching the disposal zone.

13. An animal trap comprising a casing having an unobstructed animal passage extending therethrough and an adjacent disposal zone, closure means at opposite ends of said passage and means releasably retaining said closure means in elevated position whereby said closure means are adapted to drop to closed position upon release of said retaining means, means movable to traverse the passage and move an animal body upwardly therefrom to said disposal zone, means in said casing above said passage in the path of said movable means and cooperating with said movable means to provide electrocuting means whereby an animal raised thereto is electrocuted before reaching the disposal zone, and actuating means responsive to closing movement of said closure means for automatically and continuously moving said movable means through said passage, past said cooperating electrocuting means and past said disposal zone to initial preset position.

CHESTER W. CRUMRINE.

REFERENCES CITED

The following references are of record in the file of this patent:

UNITED STATES PATENTS

| Number | Name | Date |
|---|---|---|
| 1,012,351 | Gold | Dec. 19, 1911 |
| 1,052,957 | Pryor | Feb. 11, 1913 |
| 1,199,178 | Hauser | Sept. 26, 1916 |
| 1,213,997 | Arrioja | Jan. 30, 1917 |
| 1,440,901 | Barwicki | Jan. 2, 1923 |
| 1,747,108 | Evans | Feb. 11, 1930 |
| 2,107,080 | Mitchell | Feb. 1, 1938 |
| 2,247,931 | Vincent et al. | July 1, 1941 |
| 2,360,651 | Crumrine | Oct. 17, 1944 |